United States Patent [19]
Burkett et al.

[11] Patent Number: 5,044,262
[45] Date of Patent: * Sep. 3, 1991

[54] ROTISSERIE CONTROL DEVICE

[75] Inventors: Douglas A. Burkett, Middletown;
Gary L. Mercer, West Alexandria;
Robert W. Stirling, Englewood;
David B. Winter, Eaton, all of Ohio

[73] Assignee: Henny Penny Corporation, Eaton, Ohio

[ * ] Notice: The portion of the term of this patent subsequent to Nov. 6, 2007 has been disclaimed.

[21] Appl. No.: 523,543

[22] Filed: May 15, 1990

Related U.S. Application Data

[63] Continuation of Ser. No. 239,398, Sep. 1, 1988, Pat. No. 4,968,515.

[51] Int. Cl.$^5$ .......................... A23L 1/00; A47J 27/00
[52] U.S. Cl. ........................................ 99/327; 99/332; 99/421 R; 219/492
[58] Field of Search ................... 426/233, 523; 99/327, 99/332, 447, 450, 421 R, 421 H, 421 TP; 219/492, 388, 389

[56] References Cited

U.S. PATENT DOCUMENTS 3,273,489  9/1966  Wilson ................................. 99/450
3,827,345  8/1974  Willson ................................ 99/327

Primary Examiner—George Yeung
Attorney, Agent, or Firm—Banner, Birch, McKie & Beckett

[57] ABSTRACT

A cooking device and method for selectively automatically cooking and rotating a plurality of food products is disclosed. Cooking information for several cook cycles can be stored and later used to cook selected food products automatically based on the stored cooking information. According to one embodiment, at least sear, cook and hold modes may be programmed to automatically sear, cook and a hold a food product in a rotisserie cooking device. According to another aspect of the invention, automatic fan control during a hold mode is used to selectively operate a fan in a continuous or pulsed mode to minimize product dry out and increase the amount of time a product can be held without lowering the quality of the cooked food product. Another aspect of the invention is related to determining the feasibility of reinitiating an interrupted cooking cycle based on a temperature comparison.

13 Claims, 4 Drawing Sheets

| SWITCH POSITION | POSITION NAME | CONTACT CONDITION | | | |
|---|---|---|---|---|---|
| | | A | B | C | D |
| 1 | "OFF" | OPEN | OPEN | OPEN | OPEN |
| 2 | ROTATION "STOP" | CLOSED | CLOSED | OPEN | OPEN |
| 3 | ROTATION "AUTO" | CLOSED | CLOSED | OPEN | CLOSED |
| 4 | ROTATION "ON" | CLOSED | CLOSED | CLOSED | CLOSED |

ROTATION CONTROL SWITCH

ROTISSERIE CONTROL DEVICE

This application is a continuation of application Ser. No. 239,398, filed 9/1/88, now U.S. Pat. No. 4,968,515.

CROSS REFERENCE TO RELATED APPLICATION

Reference is made to copending application Ser. No. 227,886.

BACKGROUND OF THE INVENTION

1. Field of the Invention

This invention is directed to improvements in a food cooking apparatus in general and more specifically to improvements in a rotisserie-type food cooking apparatus having at least one rotatable element for supporting a food product. More specifically, several features particularly useful for rotisserie cooking include automatic control of rotisserie cooking operations to provide simplicity of operation and consistency in the quality of cooked food products.

2. Description of the Prior Art

Use of a rotatable element to support a food product for cooking is well known. Such rotatable elements are often referred to as rotisseries, spits, skewers and a host of other names. For simplicity, the term rotisserie will be used with the understanding that this term is intended to cover all forms of rotatable elements which support food products or to which food products may be attached for cooking in all types of cooking environments including gas or electric ovens, barbecues, microwave ovens and a variety of other cooking environments. Many of these prior art rotisseries lack sophisticated controls to ensure cooking quality and consistency, and instead, depend upon user guess work. While this may be acceptable to some extent in a backyard barbecue, it is not acceptable in commercial use where quality and consistency are highly desirable.

Typical prior art rotisseries either operate the rotor whenever cooking is taking place or simply provide manually actuable on/off switches for a rotor and simple temperature control dials for selecting a desired temperature. If more than one cooking mode is desired in a cooking operation, for example, sear and cook modes, a user must first select the sear temperature, wait a desired amount of time, and then manually change the temperature to the desired cooking temperature. This requires the user to keep track of time for each cooking mode, which increases the risk of inconsistency while occupying the user's time.

Another feature used in prior art rotisseries is a fan located inside a cooking chamber to circulate air within the cooking chamber. Typically, the fan is always operating when cooking is taking place. However, in the event the food product is being held at a holding temperature while being displayed, continued operation of the fan may dry out the food product.

Another disadvantage of prior art rotisseries, especially rotisseries employing more than one rotatable element, is the difficulty of removing or replacing rotatable elements. It is often necessary in a commercial cooking environment to remove one rotatable element, attach or detach a food product, replace that rotatable element and rotate the rotisserie to a position that will easily enable a user to attach or detach a food product to/from the next rotatable element in an efficient manner.

When a food product is being cooked, an interruption in the cooking cycle may occur when a temporary power down condition occurs. This temporary power down condition may be caused by any of a number of causes which temporarily interrupts power provided to the cooking elements and prevent their operation. A problem arises when the temporary power down condition is terminated regarding whether or not to continue cooking the food product that was being cooked when the power down condition occurred. One solution, though obviously not a desirable one for social and economic reasons, is to discard any partly cooked food products. A more desirable solution is to determine whether or not to continue cooking based on information which provides an accurate indication of whether it is desirable or feasible to continue cooking the food product. One solution suggested by prior art devices is to base this determination on the amount of time that elapses between the temporary power down condition and return to a normal power condition. While this is better than discarding food products, it does not always provide an accurate indication of whether it is desirable or feasible to continue the cook cycle. Time may be a relevant parameter to be considered when determining whether to continue a cook cycle. A more relevant parameter to be considered is temperature. If the power is down for a short period of time but the temperature in the cooking device drops a significant amount, then upon return to normal power conditions, there may be a significant amount of cooking time lost while the temperature is returned to the desired cooking temperature.

In order to overcome these and other disadvantages of prior art rotisseries, the present invention provides a rotisserie control device which automates several features of the rotisserie cooking operation.

SUMMARY OF THE INVENTION

It is an object of the present invention to provide automatic control of a rotisserie cooking operation including automatic operation of various cooking operations for a variety of food products and automatic rotor control.

It is another object of this invention to prevent dryout of the food product during operation of the fan inside the cooking chamber by providing automatic fan control based on the measured temperature and the temperature set point. A related object is to increase the time period during which a food product may be cooked at a holding temperature by providing automatic fan control.

It is another object of the present invention to provide a more accurate indication as to the validity of continuing a cooking process that has been interrupted due to a temporary power down condition.

It is a further object of the invention to provide selective automatic rotor control.

It is another object of the present invention to provide a slide in menu card.

It is a further object of the present invention to provide the ability to program alarms to occur at selected times during a cook cycle.

These and other objects of the invention are achieved by providing a rotisserie-type cooking device which may be automatically operated under control of a control device. More specifically, the control may be programmed with recipe parameters which are associated with selected products and stored for subsequent or immediate use by the control. The control automatically controls the operation of the heaters, rotor and fan. Additionally, to facilitate loading of food products onto a rotisserie and for other advantageous purposes, a rotation control switch is provided to enable a user to manually operate the rotor and effectively temporarily override operation by the control.

Another feature of the present invention is a novel fan control implementation to prevent product dryout and avoid stratification of air. This control is based on a predetermined temperature and the presence or absence of a heat demand signal.

Another embodiment is directed to determining whether or not to resume an interrupted cook cycle by determining the temperature difference between the temperature at the time of the interruption and the temperature when the cause of the interruption ceases to exist. Basing the determination on the temperature difference rather than time provides a more accurate indication of the validity of resuming the interrupted cook cycle.

DESCRIPTION OF THE PREFERRED EMBODIMENT

Figure 1:
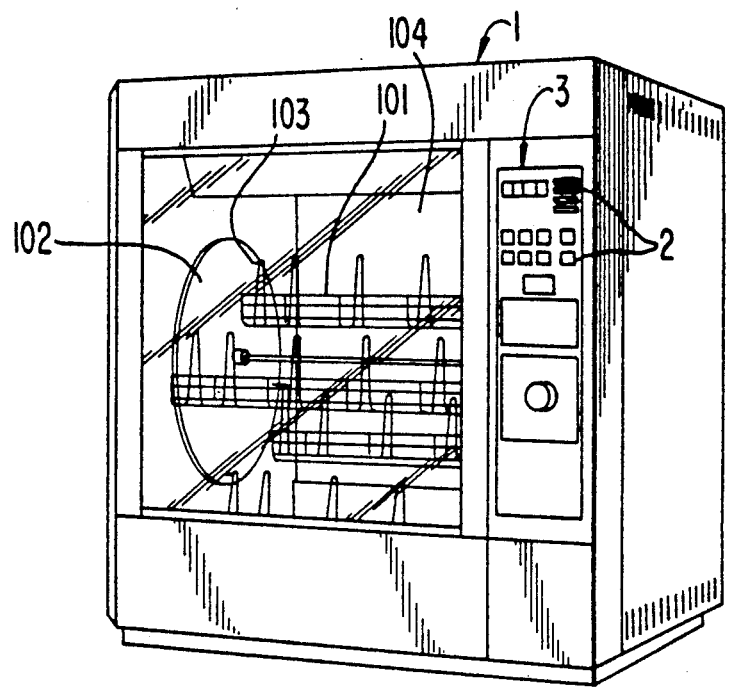
FIG. 1 shows an overall configuration of a cooking device usable with the present invention.

One aspect of the present invention is illustrated in FIG. 1 and is directed to a cooking device having a control for controlling various operations of the cooking device and especially a cooking device comprising a rotatable element for supporting food products. The cooking device is indicated generally as 1. The control may be programmed by keys indicated generally as 2 on a control panel 3 which may be located for easy access on the front of the cooking device, though other locations may be used. The control panel 3 may comprise indicators, a display, time, temperature and product selection keys, a start/stop switch and a rotation control switch. A more detailed view of the control panel 3 is presented in FIG. 2.

Figures 2, 3B:
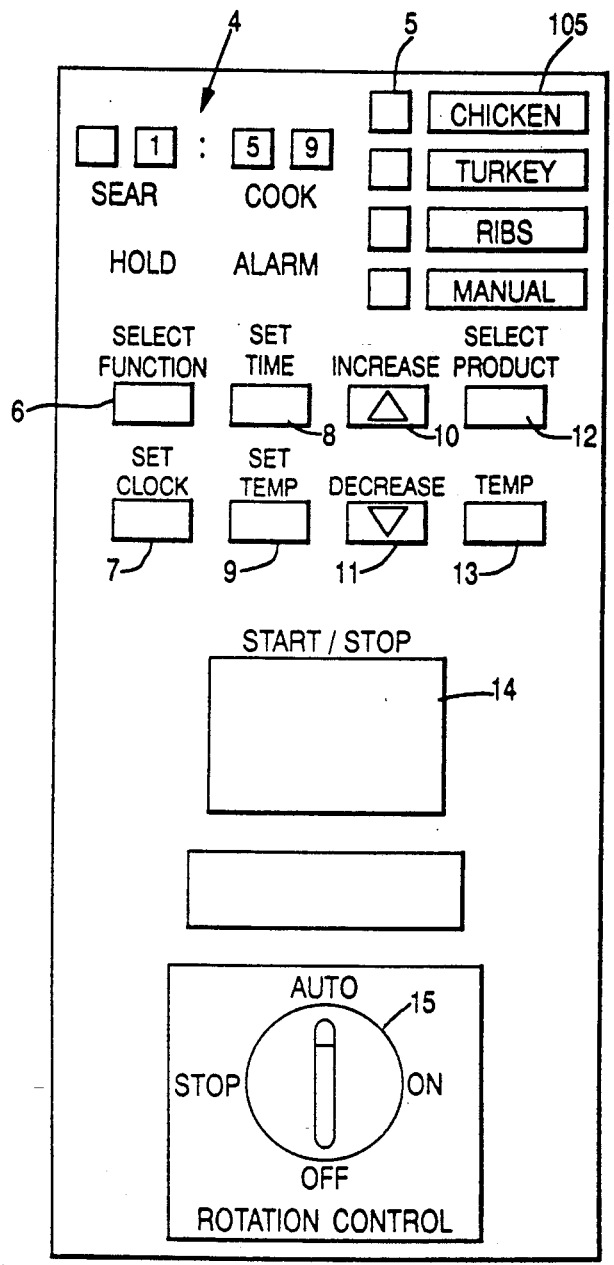
FIG. 2 is a isolated view of the control panel and switches for the cooking device of FIG. 1.

FIG. 2 shows a display 4, indicators 5, a SELECT FUNCTION switch 6, SET CLOCK switch 7, SET TIME switch 8, SET TEMP switch 9, INCREASE switch 10, DECREASE switch 11, SELECT PRODUCT switch 12, TEMP switch 13 and START/STOP switch 14. A ROTATION CONTROL switch 15 and menu card 105 is also provided.

Figure 3A:
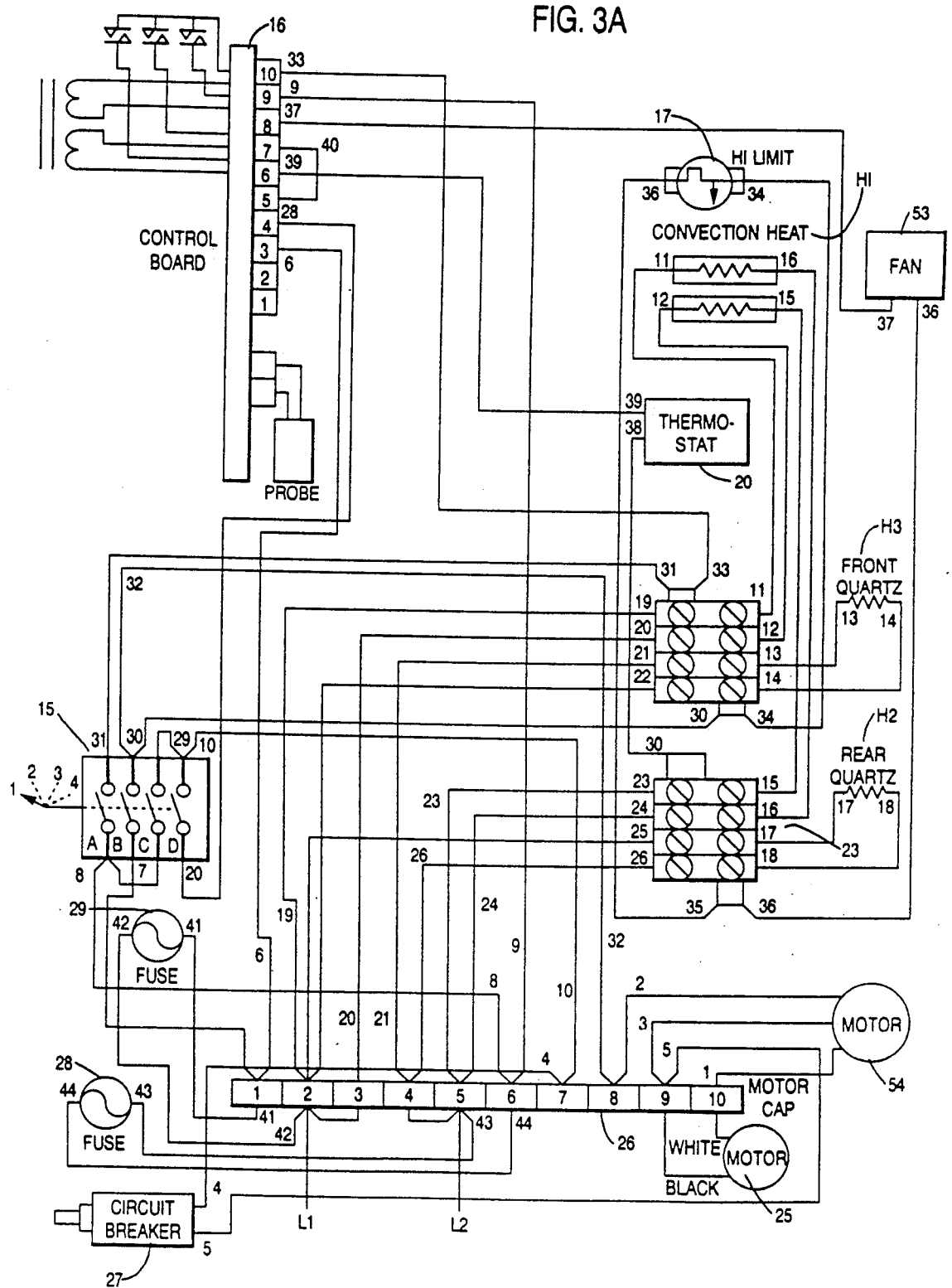
FIG. 3 is a schematic and chart illustrating the rotation control switch and associated wiring configurations for the rotisserie and heater control.
Figure 4:
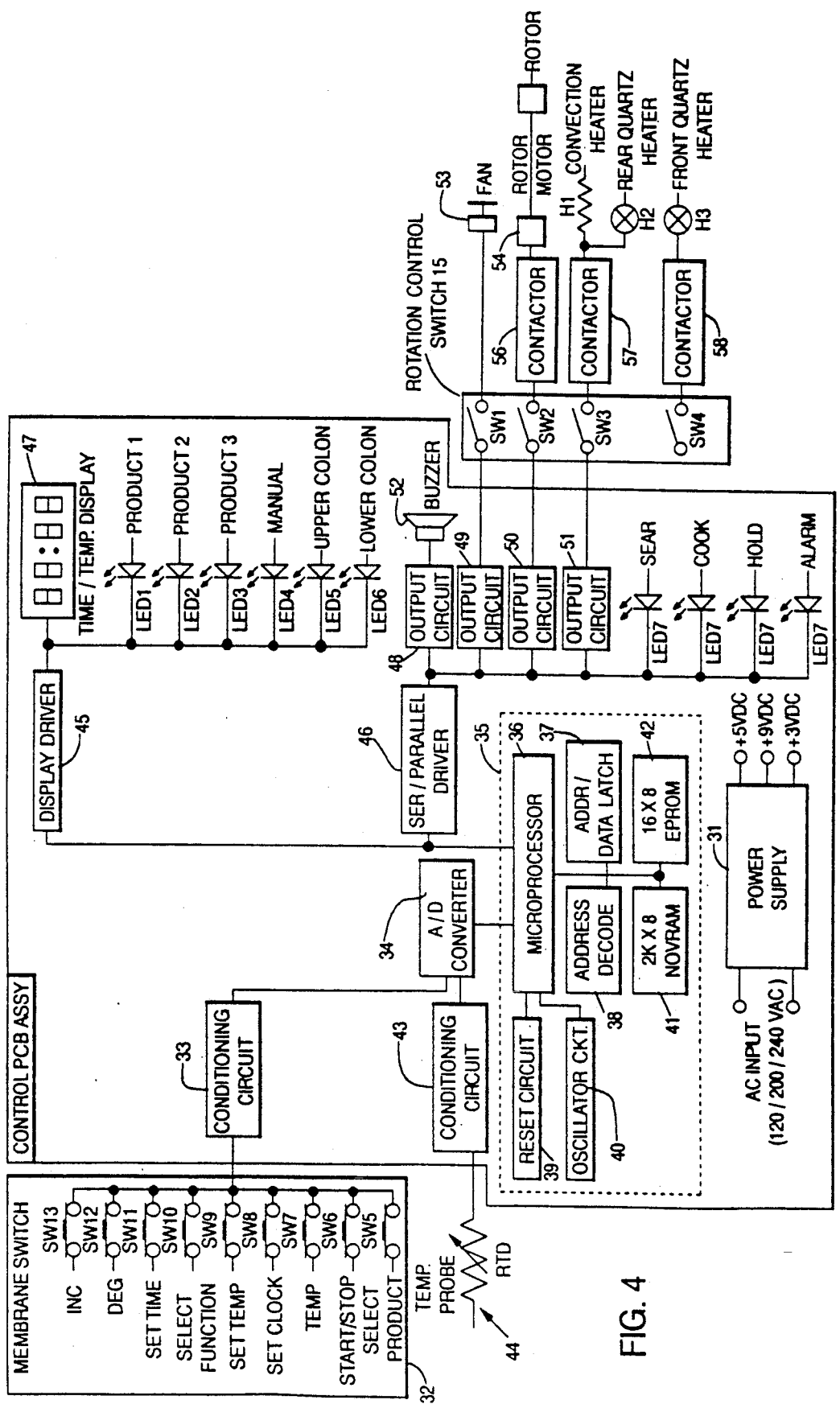
FIG. 4 is a block diagram illustrating a preferred embodiment of the control circuitry and connections for controlling the operation of the cooking device according to the present invention.

The cooking device may further comprise a convection heater and rear and front quartz heaters shown schematically in FIGS. 3 and 4 as elements H1, H2 and H3.

The time/temperature control keys 2 are useful for providing information to the control for regulating the cabinet temperature and providing timing and other program information to the control of the rotisserie. The ROTATION CONTROL switch 15 may be a four position rotary switch which provides signals, based on its position, to control the operation of a fan, rotor, convection heater and front and rear quartz heaters. Preferably these four positions may correspond to an OFF position, AUTO position, ON position and STOP position. In the OFF position the front and rear quartz heaters, the convection heat and the rotor are off. In the AUTO position, the front quartz heater is on. The control will operate to regulate the temperature using the rear quartz heater and the convection heat. The control will also switch the rotor on and off. In the ON position the front quartz heater is on. The control will regulate the temperature using the rear quartz heater and the convection heat. The rotor will turn continuously. This effectively overrides the control of the rotor by the controller. In the STOP position the front quartz heater is on. The control will regulate the temperature using the rear quartz heater and convection heat. The rotor will not turn.

With reference to FIG. 3, the operation of the ROTATION CONTROL switch 15 will be further described. Element 16 indicates generally the control board which is more fully disclosed in FIG. 4. Element 17 indicates a high limit switch which provides protection against failure of any component that would result in loss of control in any heating element. Element 1 refers to the convection heating elements which apply heat to the air in the cabinet that is in turn applied to the product being cooked. Element 53 refers to the air circulation device which may be a fan that is switched on and off under control of the controller to distribute heat from the convection element and prevent temperature stratification of the air in the cabinet in a manner that would be more fully described below. Element 20 refers to a thermostat which regulates the air temperature inside the cabinet in the event of a control or other component failure. Elements H3 and H2 refer to the quartz heaters which may be provided at the front and rear of the cooking chamber to provide radiant heat to the product as it cooks. These elements may also serve the dual function of illuminating the interior of the cabinet to provide a more attractive display. Elements 22 and 23 are contactors (relays) which switch the power to the convection heater and the quartz heaters. The contactors are operatively connected to the control 16 through rotation switch 15. These contactors correspond to contactors 56–58 of FIG. 4. Element 54 refers to a motor or other suitable drive means which turns the rotisserie to rotate the product during cooking operations. Element 25 refers to the motor capacitor which is used to help start the motor. Element 26 refers to circuit breakers which protect various control items from motor failure conditions. It also protects the motor in the event of a stalled condition. Elements 28 and 29 refer to fuses for all control items except the convection heaters and quartz heaters. Item 15 refers the rotation control switch which controls power to various control items depending on its position as described. A temperature probe is indicated by PROBE and supplies an electrical signal to the control board indicative of the air temperature of the cabinet. With reference to the rotation control switch 15, the four positions that the switch may assume are indicated by arrow 1 and dotted lines 2, 3 and 4. These correspond to the OFF, STOP, AUTO and ON positions, respectively. The chart to the right of FIG. 3, illustrates the positions of contacts A, B, C and D for each of the four positions.

Returning to FIG. 1, the cooking device 1 is further defined by a cooking chamber into which food to be cooked may be placed. The rotor elements are operatively connected to the cooking device for rotating a plurality of elongated rigid elements 101 to which food products may be attached to or supported by. The rotor elements may comprise a pair of rotatable rigid disks 102 one of which is operatively connected to be driven by rotor motor 54 and the other of which may be free floating. The disks 102 support the elongated rigid elements 101. For example, the disks may be provided with a plurality of holes 103 through which the elongated rigid elements 101 may be selectively inserted to be removably supported to enable the elongated rigid members to be move in accordance with movement of the driven disk.

It is to be understood that the elongated rigid members useable with this invention may take a variety of forms. For example, the elongated rigid members may be a single spit, a U-shaped spit, a basket-type element capable of holding a food product and capable of being rotated analogous to the structure of a ferris wheel. Moreover, a basket type structure may comprise a plurality of compartments in which a plurality of food products may be supported or a single basket for accommodating one or more food products. Furthermore, the basket may be constructed of a plurality of rigid members with spaces therebetween or substantially solid side surfaces, and with or without grids upon which the food product may be placed. Moreover, the number of elongated rigid elements that may be accommodated can vary from one to hundred or more depending in part on the size and type of the cooking device and cooking chamber or the number of cooking chambers in a device. For example, the cooking device may be supported by a counter top or another type of surface such as a floor.

For simplicity, the elongated rigid elements will be referred to as rotisseries though it is intended this term cover all above-mentioned elements and all equivalents thereof. Also, the term disks is used is by way of example only and it is to be understood that various other elements could be used to rotatably support the rotisseries. Also, while it has been described that holes may be provided in the disks to receive the spits, other mounting arrangements including support brackets, for example, will be apparent to an artisan.

Cooking device 1 is further defined by a glass door 104 or some other suitable mechanism to allow access to the cooking chamber. The glass door is preferable in order to allow the food product to be displayed to potential customers.

The cooking device 1 may be operated manually or in a program mode to defrost, sear, cook and/or hold one or more of a variety of food products. Other cooking functions may also be implemented as will be apparent to an artisan. In the manual mode, a user sets the time and temperature and mode information for cooking a food product substantially at the time of cooking and then activates the cooking operation to automatically cook the food product. In the program mode, a plurality (for example, three) different cooking recipes may be stored. These recipes may correspond to different food products and/or different recipes for the same type of food product. By way of example, chicken, ribs and turkey recipes may be stored.

To assist a user in remembering what product recipes are stored, a slide-in menu card 105 (FIG. 2) may be provided. This menu-card has the names of products for which cooking recipes are stored. The menu-card is located next to indicators 5 which are illuminated when the associated product is selected.

Figure 5:
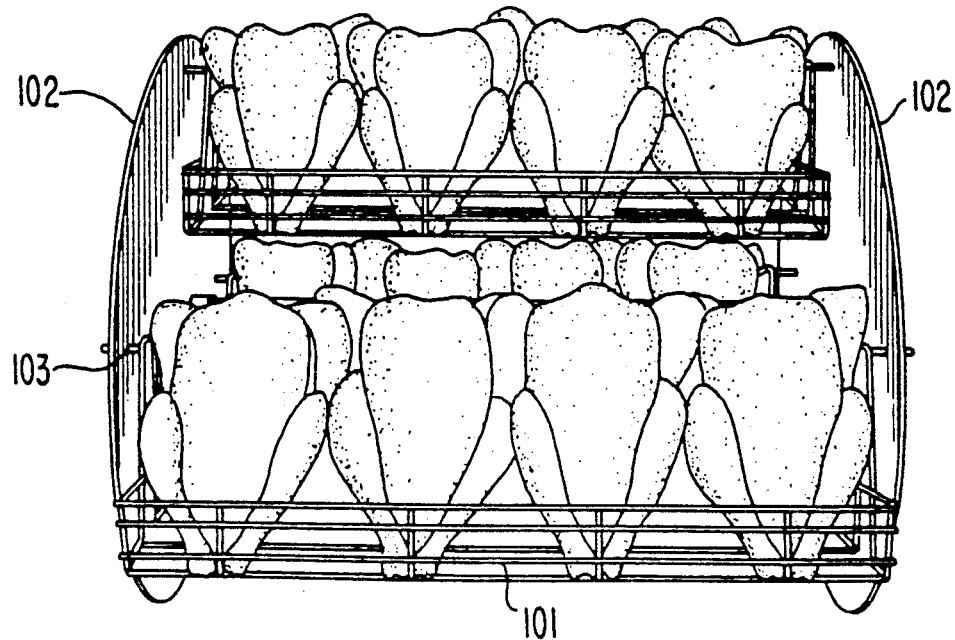
FIG. 5 is an isolated view of a rotisserie with food products supported thereon according to one embodiment of the invention.

In preparation for cooking a food product, the product is attached to or supported by a rotisserie. This may be carried out by opening the door 104 (or other access to the cooking chamber), removing a rotisserie, securing the food thereto in a known manner and replacing the rotisserie in its operative position in the cooking chamber. FIG. 5 illustrates a plural rotisserie device with a plurality of food products supported in operative position. The operative position is the position the rotisserie should be in for proper implementation during cooking.

If more than one rotisserie is provided and/or more than one food product is to be cooked, it may be necessary or desirable to partially rotate the rotor to enable or facilitate access to another rotisserie. This may be carried out by operating the ROTATION CONTROL switch 15 to the ON position until the desired amount of rotation occurs and then operating the ROTATION CONTROL switch 15 to be in the STOP position. Once all of the desired products are located in operative position within the cooking chamber, for example as shown in FIG. 5, a cooking cycle may be started by selecting either the manual or program mode, manipulating other switches if needed in a manner which will be described below, and depressing START/STOP switch 14.

Attention is now drawn to FIG. 4 which illustrates a block diagram for a preferred embodiment of the control and associated elements of the present invention. Element 31 denotes a power supply which is used to provide selected voltages to various elements in a manner that will be readily apparent to one of ordinary skill in the art. Power supply 31 may comprise fixed and/or adjustable voltage regulators to provide a plurality of desired output voltages, e.g. 3, 5 and 9 VDC.

A membrane switch 32 which may form part of control panel 3 is also provided and may comprise a plurality of switches SW6-SW13 corresponding to the keys 2 on control panel 3. The output of membrane switch 32 may be provided to A/D converter 34 through conditioning circuit 33. Conditioning circuit 33 may comprise two resistor ladders comprising a plurality of resistors and operates in a known manner. The output of A/D converter is provided to CPU core 35 which preferably comprises an MC 6803 microprocessor 36, a 74LS373 address/data latch 37, a 74LS139 one-of-four address decoder 38, a reset circuit 39, an oscillator circuit 40, a 2k×8 NOVRAM (48Z02) 41, and a 16k×8 EPROM (27C128) 42 connected with by-pass capacitors (not shown) in a manner that will be readily apparent to one of ordinary skill in the art.

Reset circuit 39 comprises two resistors forming a voltage divider of the 9 volt supply from power supply 31, an amplifier (LM 224 quad op amp package) wired as a comparator, a MOSFET (VLN222), a reset resistor and capacitor, three diodes (1N914) and a resistor for switching the reset and mode select voltages. Oscillator circuit 40 comprises a 4.000 MHz crystal and two compensation capacitors.

Another input to A/D converter 34 is the output of conditioning circuit 43 for temperature probe 44. Conditioning circuit 43 comprises a voltage divider to set a reference voltage, a noise control capacitor, an op amp to buffer the reference voltage, an op amp to buffer the temperature signal, and an op amp and associated resistors to form a differential amplifier. Temperature probe 44 may comprise a 1000-ohm platinum thin film RTD. The temperature probe is used to sense the temperature in the chamber of the cooking device.

CPU core 35 provides outputs to display driver 45 and serial to parallel driver 46. Display driver 45 comprises an MM5450 IC driver, and a resistor and capacitor to set output current limiting. Serial to parallel driver 46 comprises a UCN5890A IC driver. Display driver 45 drives time/temperature display 47 and LEDs 1-6, the function of which will be described below. Serial to parallel driver 46 drives output circuits 48, 49, 50 and 51; and LEDs 7, 8, 9 and 10.

Output circuit 48 is used to control an indicator which may comprise a buzzer 52. Output circuits 49, 50 and 51 control fan 53, rotor motor 54 and heater elements H1, H2, H3 and comprise MOC3041 triac drivers, current limiting resistors, MAC3040 triacs, pull-up resistors and R-C snubber networks.

With reference back to FIG. 2, LED 1, LED 2, LED 3, and LED 4 may be indicators 5 for product 1, product 2, product 3 and manual, respectively. For example product 1 may be chicken, product 2 may be ribs and product 3 may be turkey. LED 5 and LED 6 correspond to indicators for upper and lower colons of the time/temperature display 4. LEDs 7, 8, 9, 10 may be indicators for sear, cook, hold and alarm functions, respectively which may also be displayed.

Returning to the block diagram of FIG. 4, ROTATION CONTROL switch 15 may be a four position switch as indicated by SW1-SW4. The output of the ROTATION CONTROL switch 15 controls the operation of fan 53, rotor motor 54 (through contactor 56), convection heater H1 and rear quartz heater H2 (through contactor 57), and front quartz heater H3 (through contactor 58). In the AUTO position, the controller controls these elements automatically.

ROTATION CONTROL switch 15 which may be manually manipulable in any one of four positions indicated as AUTO, STOP, ON, and OFF. In the OFF position, the rotor is controlled to be off. In the ON position, the rotor rotates. When a desired position is reached, the rotor switch 15 may be operated to be in the STOP position to stop rotation of the rotor and enable loading of another rotisserie. This is useful when loading the desired food products onto the rotisseries and facilitates the loading operation thereof. When all of the desired products have been positioned in their operating position, a user may turn the ROTATION CONTROL switch to the AUTO position to enable full automatic control of the rotor. In this position the rotor is controlled by the CPU core 35 in accordance with the programmed or manual cycles which will be more fully described below.

The programming of the various cycles will now be described. A product cycle or the manual mode is selected by pressing the SELECT PRODUCT switch 12 until the desired product or manual mode is selected. Successively pressing switch 12 causes the following sequence: MANUAL, PRODUCT 1, PRODUCT 2, PRODUCT 3, MANUAL. The selected product is indicated by an activated LED corresponding to LEDs 1-4 of FIG. 4 next to the product name or manual in the menu area of the keypad control panel 3. The SELECT PRODUCT switch 12 is not active when the control is in a SEAR or COOK interval. Pressing SELECT PRODUCT switch 12 when the control is in the HOLD interval causes the hold mode to be deselected and the next product to be selected.

The SET TIME and SET TEMP switches 8 and 9 respectively are used to program the time, temperature and alarm parameters for each mode. For example, there may be a DEFROST mode, a SEAR mode, a COOK mode and a HOLD mode, and/or other modes for each cycle. The cycle may refer to the cooking operation for a particular product, for example, chicken, ribs or turkey. Within each cycle, there may be various intervals corresponding to the various modes and/or functions to be performed within the cycle. The programming of a desired product commences by selecting the desired product using the SELECT PRODUCT switch 12. Once the desired product is selected, as described above a particular function is selected by using the SELECT FUNCTION switch 6. The functions may be a mode such as the SEAR, COOK or HOLD modes or an ALARM function to be programmed at a particular time within the cycle. The selected function may be displayed on control panel 3 by activation of LEDs 7, 8, 9 or 10, for example.

Once a particular function for a cycle has been selected, the SET TIME 8, SET TEMP 9 and change switches (INCREASE switch 10 and DECREASE switch 11) are used to select the cooking cycle parameters. For example, by depressing the SET TIME switch 8 and manipulating the change switches 10 and 11 until the desired time is displayed, the time for the selected function may be programmed. Similarly, by depressing the SET TEMP switch 9 and manipulating the change switches 10 and 11 until the desired temperature is reached, the temperature for that interval may be programmed.

Up to 20 alarms may be set per cycle. The alarms may be programmed in the following manner. Once a desired product cycle is selected by depressing the SELECT PRODUCT switch 12, the SELECT FUNCTION switch 6 is depressed until the alarm indicator is on. This alarm indicator may correspond to LED 10 of FIG. 4. Successive alarms are displayed by pressing SET TIME switch 8. The change switches 10 and 11 are used to set the displayed alarm time in a manner similar to that of setting an interval time.

The MANUAL mode of operation will now be described. For purposes of this description, it is assumed that the ROTATION CONTROL switch 15 is in the AUTO position. (Moving this switch to STOP or ON will override the CPU control of the rotor, but will not change other parameters related to the selected product). In the MANUAL mode, the front quartz heater H3 is always on and the convection heater H1 and the rear quartz heater H2 are switched under control of CPU 35 to regulate the chamber temperature. In MANUAL mode operation, a user prepares the food product on the rotisserie, enters time, temperature and/or alarm information for the product and depresses the START/STOP switch to commence the operation of the cooking device.

It is to be understood that the term manual mode is used to describe a mode of operation in which the cooking information for a cooking cycle, which may have plural intervals, is programmed and automatic control takes place to cook and rotate the food product automatically according to the information programmed for each interval. In the manual mode, one or more SEAR, COOK, HOLD or other modes may be programmed. A difference between the MANUAL and the PROGRAM modes of operation is that in the PROGRAM mode, a plurality of recipes are pre-stored and later a selected one is recalled to perform a cook cycle. In the MANUAL mode the cooking information is stored substantially at the time cooking is to occur. Typically, e.g., the manual mode may be used when it is desired to cook an infrequently cooked product for which there is no previously stored recipe or when it is desired to cook a product with a variation in a stored recipe for that product without changing the stored recipe. Other examples of when the manual mode is desired will be apparent to one of ordinary skill in the art.

The following will now describe the operations for setting and using the cooking timer in the MANUAL mode. On entry to MANUAL mode by use of the SELECT FUNCTION switch 6, the rotor remains turned off until the operator starts the cycle with START/STOP switch 14. The cook time need not be set at the beginning of each cycle, it will remain the same until reprogrammed. The time is set with the SET TIME 9 and change switches 10 and 11. The sequence of depression is similar to the SET TEMP switch described above.

The current set time is displayed as a starting time if a cycle is not currently timing. The time, set in hours and minutes, may be set from 00:00 to 18:00 if the timer is not running. When START/STOP switch 14 is pressed, if the ROTATION CONTROL switch 15 is in the AUTO position, the rotor begins to turn and the time remaining is displayed. Pressing the START/STOP switch 14 while the cycle is running will abort the cycle and stop the rotor. The cook time remaining can be adjusted using the SET TIME switch 8 and the change switches 10 and 11 as described above. When the cooking timer counts down to 00:00 the end of cycle alarm is given. The alarm may constitute any type of alarm, display or warning signal to an operator. For example, the alarm may comprise activation of buzzer 52. The device may be controlled such that the alarm must be acknowledged by the operator by pressing the START/STOP switch 14 to turn off the alarm. The COOK indicator LED 8 turns off at the beginning of the end of cycle alarm and stays off until another cycle is started. During and after the end of cycle alarm, the control continues to regulate the temperature according to the set point temperature (desired cooking temperature) and the rotor keeps turning. If a lower hold temperature is desired, the operator must manually set it.

The heat control operation for the cooking device will now be described. The cooking device chamber temperature is regulated by using a rear quartz heater H2 and a convection heater H1. Preferably a thermostat (on/off) heat control method is used, with $-1, +0°$ F. hysteresis about the set point. Alternatively, other known heat control methods such as proportional heat control, adaptive heat control or proportional-adaptive heat control may be used. For example, if the set point is about 300° and the cooking chamber temperature, as sensed by temperature sensor probe 44, is 200°, then the heat will turn on until the cooking device temperature is 300°. The heat will turn off at 300° and remain off until the temperature drops to 299°. The heat will turn on again at 299°. The rotation control switch controls the heaters. In the AUTO position, the Controller controls the heaters.

The fan control operation will now be described. It is to be understood that any type of air circulating device can be used and the use of the term fan is intended to cover all such devices. While the cooking device is operating in any mode except a hold mode, the fan may run continuously to ensure uniform temperature. According to an advantageous feature of the present invention, the fan is operated during a hold mode in the following manner.

If the chamber temperature is greater than or equal to a predetermined temperature, e.g., 250° F., the fan is operated continuously. If the chamber temperature is less than 250° (the predetermined temperature) and the control is calling for heat, the fan is on. If the chamber temperature is not less than 250° (the predetermined temperature) and the control is not calling for heat, the fan is turned on for 10 seconds every minute to avoid stratification of air and to provide uniform temperature. The demand for heat is determined by the thermostatic control of the CPU core. The 250° temperature is by way of example and other values may be chosen. However, it has been determined empirically that the best results for these type products are obtained using 250° as the predetermined temperature.

This control scheme advantageously provides minimum air flow during a hold mode to reduce product dry out and increase holding time. This can be especially important in commercial uses where a product is often cooked and maintained at a selected temperature corresponding to a hold mode in at least a partially glass enclosed chamber to enable customers to view the product. Sometimes, for example, a quantity of products are cooked in the morning or afternoon and held until lunch or dinner time at which times product demand typically increases if the product is a lunch or dinner item for example chicken, ribs or turkey. It is important therefore to be able to prepare a quantity of products and maintain them at a temperature to enable the product to be served with little or no reheating while preventing excessive drying out or over cooking of the product. The use of the novel fan control in accordance with the present invention has been found to satisfactorily achieve these goals.

The operation of display 4 will now be described. When a cycle is not timing, the time of day is displayed. The chamber temperature may be displayed by pressing the TEMP switch 13. The alarm display and end of cycle alarm override and abort the temperature display, otherwise the TEMP switch is always active. Preferably, the chamber temperature display range may be from 100° to 500° F. Below this range the display will show LO in the center digits. Above this range the display will show HI in the center digits.

The current set point temperature desired cooking temperature can be displayed or changed at any time (except during the end of cycle alarm) by pressing SET TEMP switch 9. The current set point temperature is displayed as long as the switch is depressed and for 5 seconds after its released. To change the temperature, the SET TEMP switch 9 is released, then the change switches 10 and 11 are used to adjust the temperature. The set point temperature can be set from 100° to 500° F.

The steps to be performed to cook a food product using the pre-programmed recipe information including time, temperature and alarm information in the programming mode of operation will now be described. One or more of the preprogrammed products may be cooked using the program mode. Each cycle may comprise a plurality of intervals. For example, there may be defrost, sear, cook and hold intervals within a cycle. Moreover, more than one cook interval, may be programmed for a cycle if desired.

For example, an initial cook interval may be at temperature A° and for a time X minutes and a second cook interval may be at temperature B° for a time Y minutes. Alarms may be programmed to occur before, during or after any of the intervals. It will be assumed that the ROTATION CONTROL switch 15 is in the AUTO position. As previously explained, the rotor can be forced on or off at any time by operating the ROTATION CONTROL switch 15.

To begin cooking a preprogrammed product, an operator selects a desired programmed cycle by depressing the SELECT PRODUCT switch 12. The selected product is indicated at 5 by an LED (1-3) next to the name of the product in the menu card area 105 of the control panel 3. Selecting a cycle with the SELECT PRODUCT switch 12 causes the controller to turn the rotor and heat off. To start a cycle, the START/STOP switch 14 is pressed and the rotor is controlled to turn. This also starts the cooking timer countdown implemented by CPU 35 in a manner that would be readily apparent to one of ordinary skill in the art. If the first programmed interval is a SEAR interval for example, the display 4 shows the time remaining and the sear indicator, LED 7, will be activated while the sear interval is timing out.

At the end of a time period corresponding to the programmed sear interval time, the sear interval will be terminated, LED 7 will be de-activated and the control will implement the next programmed interval if any. A cycle may be aborted during interval by pressing the START/STOP switch 14. This will turn the rotor off and stop the timer. Other intervals are implemented in a similar manner.

The time remaining display 4 displays the total time remaining in the cook cycle, i.e., the sum of the times for all intervals for the selected cycle. For example, if the sear interval time is programmed to 10 minutes and a cook interval time is programmed to 2 hours, the display will read 2:10 when the cycle is first started.

If an operator has programmed alarms to occur during a cycle, they will override the normal time remaining display when they occur. An alarm may comprise a number of flashes of "ALxx" alternating with blanks at a predetermined rate on the display. "xx" is the alarm number, which may indicate the alarm condition to an operator via a look up chart. The alarm may further comprise activation of a buzzer 52 for example to provide an audible indication of an alarm occurrence. At the end of a cycle (when the cooking timer counts down to 00:00) an end of cycle alarm may occur. If a cook interval was being performed at this time, the cook indicator LED 8 turns off, the hold LED 9 turns on, and the control regulates the cabinet temperature according to the programmed hold temperature if any.

In the hold mode, the control operation after the end of cycle alarm depends on the programmed hold time. If the hold time is 00:00 hold is not entered at the end of the cook cycle. If the hold time is from 00:01 up to the maximum hold time then the control will remain in the hold mode until the programmed hold time elapses. At that time, an end of hold alarm may occur which may be identical to or distinguishable from the end of cycle alarm. The rotor, rear quartz heater, convection heater and hold indicator LED will turn off at that time.

By way of example, the sear mode is characterized generally by a high temperature for a relatively short period of time to sear the product. The cook mode is typically of longer duration and at a somewhat lower temperature. The hold time can vary as needed any is typically a relatively low temperature.

If an interruption to the power occurs during a cooking cycle, a determination is made by the controller when the power is resumed whether or not to continue the interrupted cycle. This determination is made by storing the temperature of the chamber at the time of the interruption and sensing the temperature when power is resumed. If the difference is less than a predetermined amount, e.g. 20°, then the controller resumes the cooking cycle that was in progress when the interruption occurred. This temperature comparison is performed in CPO35 in a manner that will be apparent to a artisan.

A more accurate indication of the validity of continuing a cooking cycle is provided by a temperature based determination rather than a time based determination. For example, a relatively short time may elapse from the time of interrupt to the time power is restored, but the temperature may drop significantly depending on the environment, insulation and composition of the cooking chamber and a number of other factors. The temperature difference is important because if the cooking cycle is resumed, it takes a while to return to the original set temperature which may cause an underdone product. This is due to the fact that the product doneness is related to the number of degree-seconds of heat provided to the food.

We claim:

1. A cooking device for automatically cooking and rotating food products comprising:
   a cooking chamber defined by a plurality of inner walls of the cooking device for receiving food products to be cooked;
   heating means operatively associated with said cooking chamber for heating food products located in said cooking chamber;
   rotor means operatively connected to said cooking chamber for supporting and rotatably moving food products located within said cooking chamber;
   selection means operable by a user of the cooking device for selecting desired cooking parameters;
   storage means connected to said selection means for storing the user selected cooking parameters; and
   control means responsive to the user selected cooking parameters stored in said storage means for controlling the operation of said heating and rotor means to automatically cook the food products supported by said rotor means in said cooking chamber in accordance with the user selected cooking parameters,
   wherein the user selected cooking parameters comprise cooking time, cooking temperature, and alarm information for a selected food product.

2. The cooking device of claim 1 further comprising a rotor control switch capable of being manipulated to a plurality of positions by a user, where at least one of said positions enables the rotor control switch to override the control means control of the rotor means;
   said selection means are further operable to select one of the stored cooking cycles corresponding to a selected food product; and wherein said control means is capable of controlling the rotor and heater means to cook food products in accordance with the stored cooking cycles.

3. A cooking device for automatically cooking and rotating food products comprising:
   a cooking chamber defined by a plurality of inner walls of the cooking device for receiving food products to be cooked;
   heating means operatively associated with said cooking chamber for heating food products located in said cooking chamber;
   rotor means operatively connected to said cooking chamber for supporting and rotatably moving food products located within said cooking chamber;
   selection means operable by a user of the cooking device for selecting desired cooking parameters; and
   storage means connected to said selection means for storing the user selected cooking parameters;
   control means responsive to the user selected cooking parameters stored in said storage means for controlling the operation of said heating and rotor means to automatically cook the food products supported by said rotor means in said cooking chamber in accordance with the user selected cooking parameters,
   wherein the user selected cooking parameters define cooking cycles for a plurality of food products which are stored in said storage means, said selection means selects one of the stored cooking cycles corresponding to a selected food product, and said control means controls the rotor and heating means to cook the selected food product in accordance with the selected cooking cycle.

4. The cooking device of claim 3 wherein each of the cooking cycles comprises one or more different operational modes, where each mode is defined by time and temperature parameters.

5. The cooking device of claim 4 wherein the plurality of different operational modes comprise at least a sear mode, a cook mode or a hold mode, and further wherein said control means controls the rotor and heater means in each of the modes to sear, cook or hold the selected food product.

6. The cooking device of claims 1, 2, 3, or 4 further comprising:
   temperature sensing means for sensing the temperature within said cooking chamber;
   heat demand means for determining a demand for heat;
   comparison means for comparing the temperature sensed by said sensing means with a predetermined temperature; and
   circulation means for circulating a cooking medium within said cooking chamber,
   wherein said control means controls said circulation means when the cooking device is in one of a plurality of operational modes, to be operated:
   a) continuously when the temperature sensed by said sensing means is greater than the predetermined temperature or when the temperature sensed by said sensing means is less than the predetermined temperature and said heat demand means determines a need for heat, and
   b) in a pulsed manner with a predetermined pulse repetition rate when the temperature sensed by said sensing means is less than said predetermined temperature and said heat demand means does not determine a need for heat, wherein said cooking parameters comprise cooking alarm information.

7. A cooking device for automatically cooking and rotating food products comprising:
   a cooking chamber for receiving food products to be cooked;
   heating means for heating the food products located in said cooking chamber;
   rotor means for supporting and rotatably moving the food products located in said cooking chamber;
   selection means for selecting desired cooking parameters;
   storage means for storing the selected cooking parameters;
   control means for controlling the operation of said heating and rotor means to automatically cook said food products located in said cooking chamber in accordance with the stored cooking parameters.

8. A cooking device in accordance with claim 7 further comprising:
   circulation means for circulating a cooking medium within said cooking chamber;
   temperature sensing means for sensing the temperature within said cooking chamber;
   heat demands means for determining a need for heat; and
   comparison means for comparing the temperature sensed by said sensing means with a predetermined temperature,
   wherein said control means controls said circulation means when said cooking device is in one of a plurality of operational modes such that the circulation means is operated:
   a) continuously when the temperature sensed by said sensing means is greater than said predetermined temperature or when the temperature sensed by said sensing means is less than said predetermined temperature and the heat demand means determines a need for heat, and
   b) in a pulsed manner with a predetermined repetition rate when the temperature sensed by said sensing means is less than said predetermined temperature and the heat demand means does not determine a need for heat.

9. A cooking device in accordance with claim 8 further comprising means for setting the predetermined temperature at 250° F.

10. A cooking device in accordance with claim 7 further comprising:
   sensing means for sensing interruption of a cooking operation, said storage means storing a first temperature corresponding to the temperature of the cooking chamber when said sensing means senses interruption of the cooking operation, said sensing means thereafter sensing when said interruption has ceased to exist, said storage means storing a second temperature corresponding to the temperature of the cooking chamber when said sensing means senses cessation of the interruption; and
   comparison means for comparing the first and second stored temperatures,
   wherein, after said sensing means senses cessation of the interruption of the cooking operation, said control means controls said heating and rotor means to continue the cooking operation if the difference between the first and second temperatures is less than a predetermined value.

11. A cooking device in accordance with claim 10 further comprising means for setting the predetermined value at 20° F.

12. A cooking device in accordance with claim 7 wherein the cooking parameters define cooking cycles for a plurality of food products, said selection means comprises means for selecting one of the stored cooking cycles corresponding to a selected food product, and said control means controls the rotor and heating means to cook the selected food product in accordance with the selected cooking cycle.

13. A cooking device in accordance with claim 12 further including indicating means for indicating the selected cooking cycle.

* * * * *